United States Patent [19]
Peterson et al.

[11] Patent Number: 4,897,005
[45] Date of Patent: * Jan. 30, 1990

[54] GUTTED U-NUT

[75] Inventors: Francis C. Peterson, Woodbury; Michael G. Gagnon, Oakville, both of Conn.

[73] Assignee: Buell Industries, Inc., Waterbury, Conn.

[*] Notice: The portion of the term of this patent subsequent to Mar. 8, 2005 has been disclaimed.

[21] Appl. No.: 128,432

[22] Filed: Dec. 3, 1987

Related U.S. Application Data

[63] Continuation-in-part of Ser. No. 33,175, Apr. 1, 1987, Pat. No. 4,729,706.

[51] Int. Cl.$^4$ ............................................. F16B 37/02
[52] U.S. Cl. .................................... 411/175; 411/174; 411/112; 411/523
[58] Field of Search ............................ 411/172–175, 411/436, 437, 522–524

[56] References Cited

U.S. PATENT DOCUMENTS

| | | |
|---|---|---|
| 3,229,743 | 1/1966 | Derby . |
| 3,426,818 | 2/1969 | Derby . |
| 4,243,086 | 1/1981 | Kuttler et al. .................. 411/523 X |
| 4,396,326 | 8/1983 | McKinnie .......................... 411/103 |
| 4,408,939 | 10/1983 | Graft ................................. 411/112 |
| 4,508,477 | 4/1985 | Oehlke .............................. 411/174 |
| 4,643,610 | 2/1987 | Bien .............................. 411/175 X |
| 4,714,392 | 12/1987 | Muller et al. ................... 411/524 X |
| 4,729,706 | 3/1988 | Peterson et al. .................... 411/175 |

FOREIGN PATENT DOCUMENTS 2515301  6/1975  Fed. Rep. of Germany .

Primary Examiner—Gary L. Smith
Assistant Examiner—Suzanne L. Dino
Attorney, Agent, or Firm—St. Onge, Steward, Johnston & Reens

[57] ABSTRACT

A fastener clip is adapted to be pushed onto an edge of sheet materials of varying thicknesses. The clip has two legs. The first leg has cut from it a U-shaped elongated tongue with an elongate aperture which is between the two legs; the tongue is gutted to provide a clearance between the outer perimeter of the tongue and the surrounding portions of the first leg. The elongated tongue has a length to width ratio of at least 1.3:1. The second leg has a threaded means opposite the elongate aperture for receiving a bolt.

8 Claims, 1 Drawing Sheet

GUTTED U-NUT

The present application is a continuation-in-part of U.S. Pat. application 07/033,175, now U.S. Pat. No. 4,729,706 to Francis C. Peterson and Phillip D. Becker for a Fastener Clip.

BACKGROUND OF THE INVENTION

1. Field of the Invention

The present invention relates to an improved U-nut which will frictionally mount on a sheet material and engage a bolt hole in the sheet, and which is used in securing an object to a sheet material.

1. Description of the Prior Art

A U-nut currently used in the automotive industry for securing objects to sheet materials comprises a U-nut having two joined legs between which the sheet material is disposed. Typically, one leg has a semi-circular tongue which extends toward the other leg, and which frictionally engages the sheet material and a bolt hole therein, and the second leg has integrally formed thereon a threaded barrel which serves as a nut. The semi-circular tongue has a circular hole through which a threaded bolt can be passed to insert into the threaded barrel of the second leg. This known U-nut is described in U.S. Pat. No. 3,426,818 to Derby for a Yielding Nut Retainer. Another such U-nut or J-nut is described in U.S. Pat. No. 3,229,743 to Derby for a Sheet Metal Nut with Yielding Retainer.

It has been found that the prior art U-nuts suffer several practical drawbacks in that they require a relatively high amount of force to push the U-nut onto sheet materials having a thickness greater than 2 millimeters. For example, a U-nut such as that shown in Darby '818 generally requires a push on force in the range of 16 to 20 pounds for a 4 millimeter thick sheet. In addition the manufacturing step of heat treating the U-nut can lead to variations in the gap between the tongue and the second leg, which will also create wide variations in the amount of force necessary to push such a U-nut onto a sheet material of a particular thickness. Such U-nuts also show a large variation of push on force when used with sheet materials of varying thickness. Finally, it has been found that the prior art U-nut may in some cases be easily dislodged; for instance a very low pull off force, on the order of 0.4 pounds of force, is all that is needed to remove the U-nut which has been mounted on thicker sheets such as a 4 millimeter thick sheet.

SUMMARY OF THE INVENTION

It is the object of the present invention to provide an improved U-nut which is adapted for use with a range of material thicknesses, and which requires a push on force of only about 6-8 pounds to mount onto a 4 millimeter thick sheet, and which will provide a relatively high pull off force so that the U-nut will stay mounted on a sheet. A further object of the invention is to provide a U-nut which can be manufactured to consistently provide a low push on force and high pull off force.

These objects, and other objects which will become apparent from the description which follows, are achieved by a device in accordance with the invention, which comprises a U-nut of the type having two joined legs, the first leg having an elongated U-shaped tongue formed thereon, and the second leg having threaded means for receiving a fastener. The portion of the first leg which surrounds the tongue is gutted to provide clearance around the perimeter of the U-shaped tongue. The U-shaped tongue has an elongate aperture instead of the circular hole of the prior art U-nuts. The U-shaped tongue is bent towards the second leg so as to frictionally engage the surface of a sheet material and a bolt hole in that sheet. A tab is formed at the tip of the tongue to assure proper alignment of the elongate aperture with the bolt hole in the sheet and to prevent the tongue from catching the bolt hole when removing the U-nut from a sheet material. The gutted elongated spring arm provides a very low push-on force for mounting the U-nut onto a sheet, and also gives even degree of clamping force on sheet materials disposed between the U-nut legs. The tongue has a lengthened spring arm to provide a consistent clamping force on materials disposed between the U-nut legs, yet yields easily to allow the U-nut to be mounted on materials of varying thickness.

DETAILED DESCRIPTION OF THE INVENTION

The invention will now be illustrated further with respect to the drawings.

Figure 1:
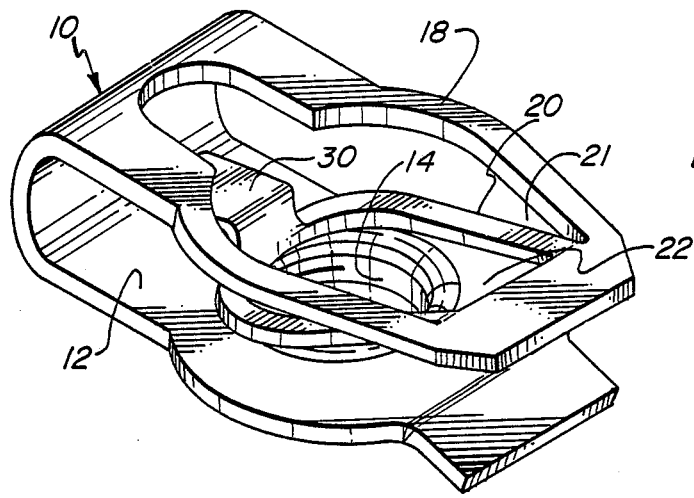
FIG. 1 is a perspective view of a U-nut accordance with the invention.
Figure 2:
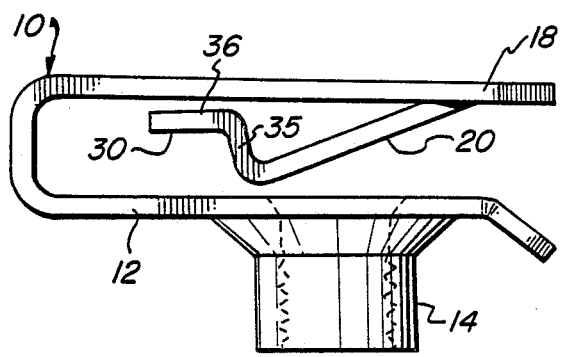
FIG. 2 is a side elevation view of a U-nut in accordance with this invention.
Figure 3:
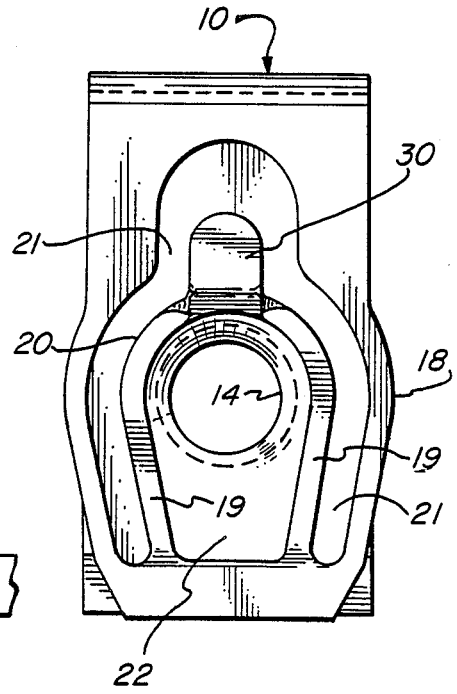
FIG. 3 a plan view of a U-nut in accordance with this invention.
Figure 4:
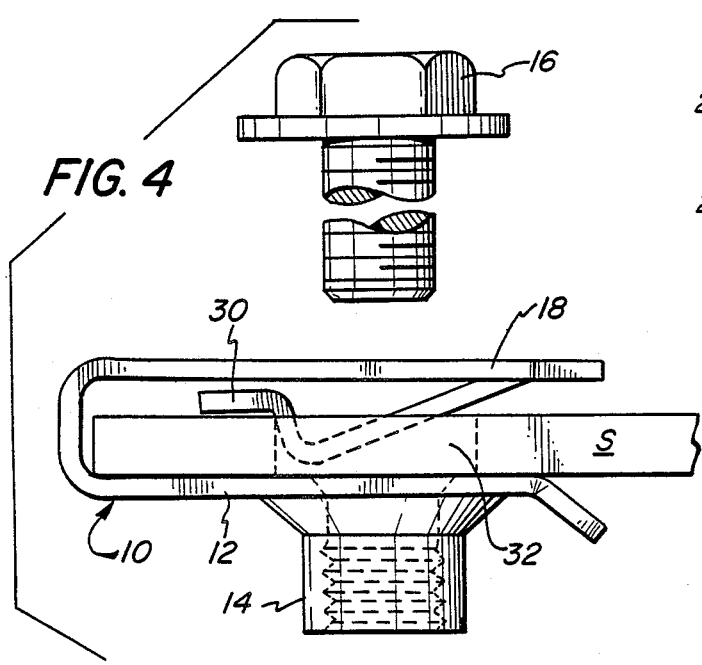
FIG. 4 a side view of a U-nut with a sheet material disposed between its legs.

The U-nut is formed by stamping from a metal sheet such as steel or aluminum. With reference to FIGS. 1, 2, 3 and 4, a U-nut 10 is shown. U-nut 10 includes leg 18 which has punched from it elongated tongue 20. Tongue 20, as seen in FIG. 3, is generally U-shaped and has an oblong or elongate aperture 22. Elongate aperture 22 may be squared off where tongue 20 joins leg 18. Tongue 20 is gutted; that is, the portion of leg 18 which surrounds tongue 20 is cut out to provide a gutting 21. Gutting 21 allows tongue 20 to bend freely without binding or other interference with the portions of leg 18 from which tongue 20 is punched out. Tongue 20, as seen in FIG. 2 is bent or angled towards leg 12, such that it can frictionally engage a sheet material and a bolt hole 32 therethrough inserted between legs 12 and of the U-nut 10. U-nut 10 includes leg 12 with a threaded means such as an integral internally screw threaded barrel 14 opposite the elongate aperture 22; the threaded means 14 is designed to receive a screw threaded fastener 16, as shown in FIG. 4.

Tongue 20 has at its free end a tab 30. Tab 30 is shown in FIG. 2 as having a first segment 35 which is bent back approximately to the plane of leg 18, at which point tab 30 is bent at a right angle to form a second segment 36 which extends towards the join 38 between legs 12 and 18, and which lies substantially within the plane of leg 18. Tab 30 serves to assure that the U-nut is properly centered on bolt hole 32 in sheet S. Tab 30 also prevents the tongue 20 from passing through bolt hole 32. If the tongue 20 passes completely through sheet S, then the sheet S will slide up the tongue 20, preventing removal of the U-nut from the sheet. Tab 30 allows the U-nut 10 to be removed from a sheet material without the tongue 20 catching and binding in bolt hole 32. Tab 30 is also surrounded by gutting 21 so that it will not bind with the leg 18. The second segment 36 of tab 30 provides a large flat surface prevents the stress concentration which can damage plastic sheet materials when a fastener 16 is threaded into threaded means 14.

FIG. 4 illustrates the U-nut configured for use with a threaded fastener 16. A sheet material S is inserted between the legs of U-nut 10, and the U-nut is held in place by the clamping effect of tongue 20 pressed against the sheet material and by the registration of tongue 20 in bolt hole 32. Typically an object to be fastened to the sheet material would be placed on leg 18. The internally screw threaded barrel 14, the elongate aperture 22 and the bolt hole 32 in sheet S are all aligned once the U-nut is mounted. The fastener 16 may be inserted through the openings and secured by threading into the threaded barrel 14.

It is to be appreciated that the U-nut of the present invention requires a low mounting force because of the lengthed spring arm provided by elongate tongue 20 and because of the elimination of binding between the tongue and the first leg provided by gutting 21. Prior art clips such as Darby '818 and Darby '743 present very high push on forces because the tongue on these U-nuts do not provide a long bending moment.

In the present invention, the elongated tongue 20 formed by punching an elongate hole in the first leg 18 has lengthened metal strips shown in FIG. 3 as each arm 19 of the U-shaped tongue. In comparison, the prior art U-nuts have short arms. The prior art U-nuts have a tongue with substantially semi-circular dimensions, with a length to width ratio of about 1:1, whereas the fastener clip 10 of the present invention has a tongue 20 having an elongate shape with a length to width ratio of at least 1.3:1. Furthermore, instead of a substantially semi-circular tongue used by the prior art U-nuts, the present invention employs a substantially elongate tongue shape which allows the use of straight spring arms 19 which yield more easily than do the curved arms of the prior art U-nuts. The elongated shape of the tongue 20 allows bending of the U-shaped tongue 20 over at least half of its length, so that the force required to push the clip onto a sheet is reduced. The spring characteristics of a metal tongue are such that for a particular bending point, each successive incremental amount of bending requires a larger amount of force than the prior increment of bending. Thus by increasing the number of bending points, in this case by elongating the tongue 20, the total amount of bending can be spread over many bending points so that the total amount of bending can be achieved with less total force than where there is a single bending point.

In addition, the gutting 21 eliminates the binding between the tongue and first leg of prior art clips caused when the tongue is pushed back through the area in the first leg from which the tongue was sheared, when the U-nut is pushed onto a sheet. This frictional interference has been found to increase the push on force to mount a U-nut onto a 4 millimeter thick sheet by as much as five pounds.

By eliminating this binding and by providing an elongated spring arm it has been found that the U-nut of the present invention may be mounted on a 4 millimeter thick sheet with as little as six to eight pounds of push on force. This low push-on force is a sizeable reduction from the about 20 pounds force required to mount the prior art U-nuts onto the same sheet.

Despite the reduction of push on force for mounting the U-nut of the present invention stays in place once mounted, and has been found to require a pull-off force of at least three pounds to remove the U-nut from a 4 millimeter sheet. The reduced mounting effort of the U-nut of the present invention makes it particularly desirable for assembly line use where an assembly worker may develop tendonitis problems with products having a high mounting effort.

The present invention provides an ease of installation not available in the prior art. In addition, the length of the spring arm formed by the tongue 20 allows a consistent clamping pressure to be applied to sheet materials of a range of thickness.

What is claimed is:

1. A fastener assembly, comprising:
   a clip having first and second legs,
   (a) said first leg having a substantially U-shaped elongated tongue for engaging a sheet material,
      (i) said tongue having long uniform spring arms formed of substantially straight substantially uniform width metal strips connected to said first leg at the tips of said strips, said spring arms having a uniform spring action over their length,
      (ii) a substantially elongated oblong aperture being provided in said tongue;
      (iii) substantial clearance being provided between said tongue and said first leg; and
   (b) said second leg having means for receiving a threaded fastener formed thereon;
   said clip being mountable onto a sheet material having a thickness of about four millimeters with as little as about 8 pounds of force.

2. A fastener assembly in accordance with claim 1, wherein said clip mounted onto a sheet material having a thickness of about four millimeters requires a pull-off force of at least three pounds to remove said clip from said sheet material.

3. A fastener assembly in accordance with claim 2 wherein said spring arms are sufficiently elongated whereby they extend for a substantial distance away from said axis of said threaded barrel, whereby said fastener assembly may be mounted onto sheet materials having a substantial range of material thicknesses with a push-on force of less than about 8 pounds.

4. A fastener assembly in accordance with claim 3, wherein said U-shaped tongue has a length to width ratio of at least 1.3:1.

5. A fastener assembly in accordance with claim 4 wherein said oblong aperture is squared off at one end where said tongue joins said first leg.

6. A fastener assembly in accordance with claim 5 further comprising a tab formed on the free end of said tongue, said tab having a first segment extending from said tongue end to said first leg, and a second segment at right angles to said first segment and extending parallel to the plane of said first leg towards the join between said first and second legs.

7. A fastener assembly in accordance with claim 6 wherein said means for receiving a threaded fastener comprises an internally threaded barrel having an axis substantially perpendicular to said first leg.

8. A fastener assembly, comprising:
   a clip having substantially parallel first and second legs joined together with a space therebetween for receiving a sheet material,
   (a) said first leg having a substantially U-shaped elongated tongue for engaging a sheet material,
      (i) said tongue having spring arms formed of narrow metal strips connected to said first leg at the tips of said strips, said spring arms being elongated and substantially straight and having a substantially uniform width over their spring acting length, and having uniform spring action over their length, (ii) said tongue being formed from said first leg with a substantial clearance between said tongue and first leg when said tongue and first leg are located in the same plane, (iii) a substantially elongated oblong aperture provided in said tongue, said aperture being squared off at one end where said tongue joins said first leg, (iv) a tab being formed on the free end of said tongue, said tab having a first segment extending from said tongue end to said first leg, and a second segment at right angles to said first segment and extending parallel to the plane of said first leg towards the join between said first and second legs, (v) said tongue having a length to width ratio of about 1.3:1; and (b) said second leg having an internally threaded barrel for receiving a threaded fastener formed thereon, said internally threaded barrel having an axis substantially perpendicular to said first leg, and wherein said spring arms extend for a substantial distance away from said axis;

(c) said clip being mountable on a sheet material having a thicknesses of about four millimeters with a push-on force of about six to about eight pounds, and requiring a pull-off force of at least three pounds to remove said clip from said sheet.

* * * * *